Nov. 18, 1941.    A. E. GAY    2,262,761
GYMNASTIC TESTING APPARATUS
Filed Sept. 4, 1940    2 Sheets-Sheet 1
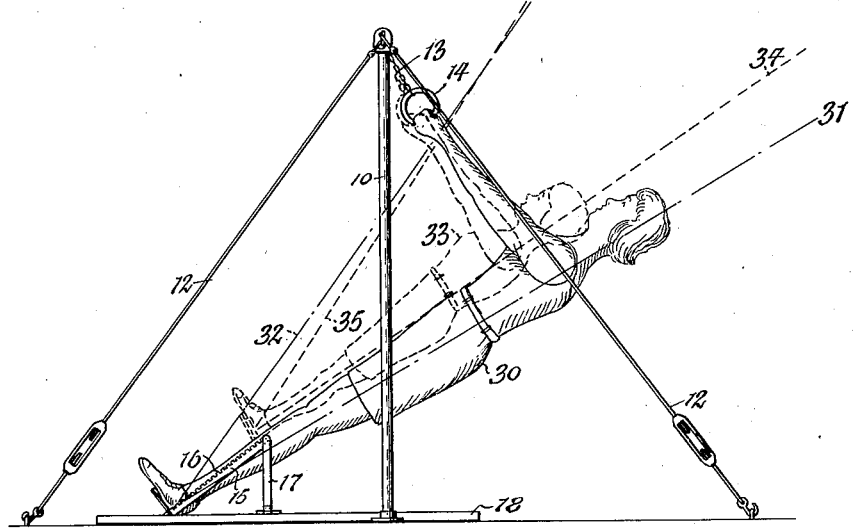
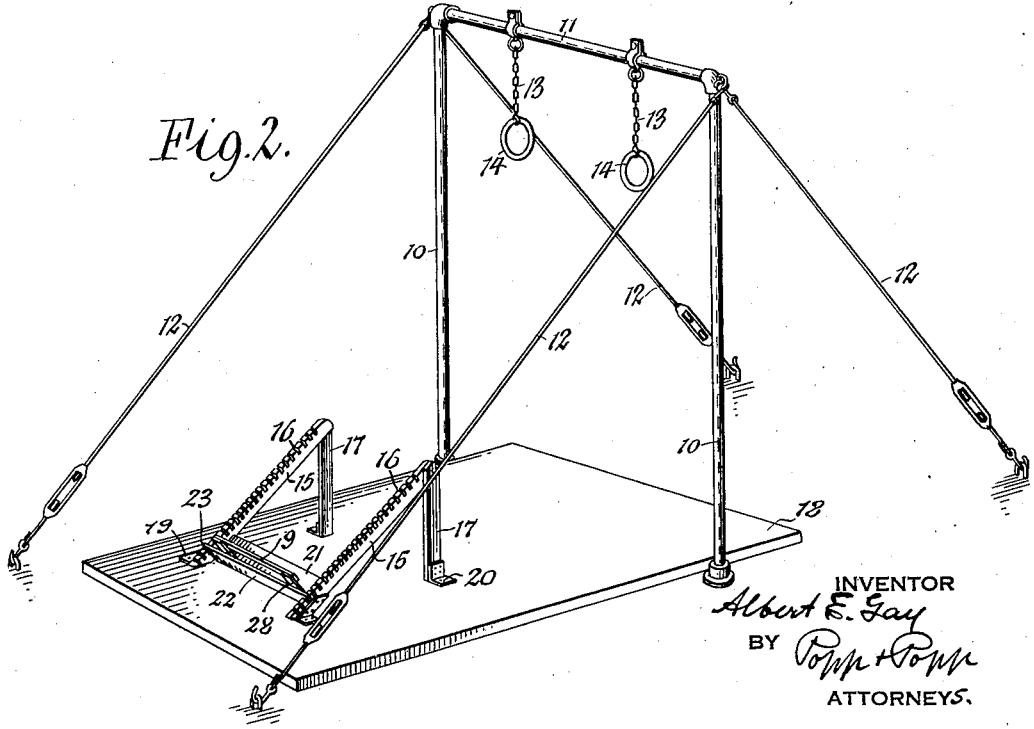
INVENTOR
Albert E. Gay
BY Popp & Popp
ATTORNEYS.

Nov. 18, 1941.   A. E. GAY   2,262,761
GYMNASTIC TESTING APPARATUS
Filed Sept. 4, 1940   2 Sheets-Sheet 2
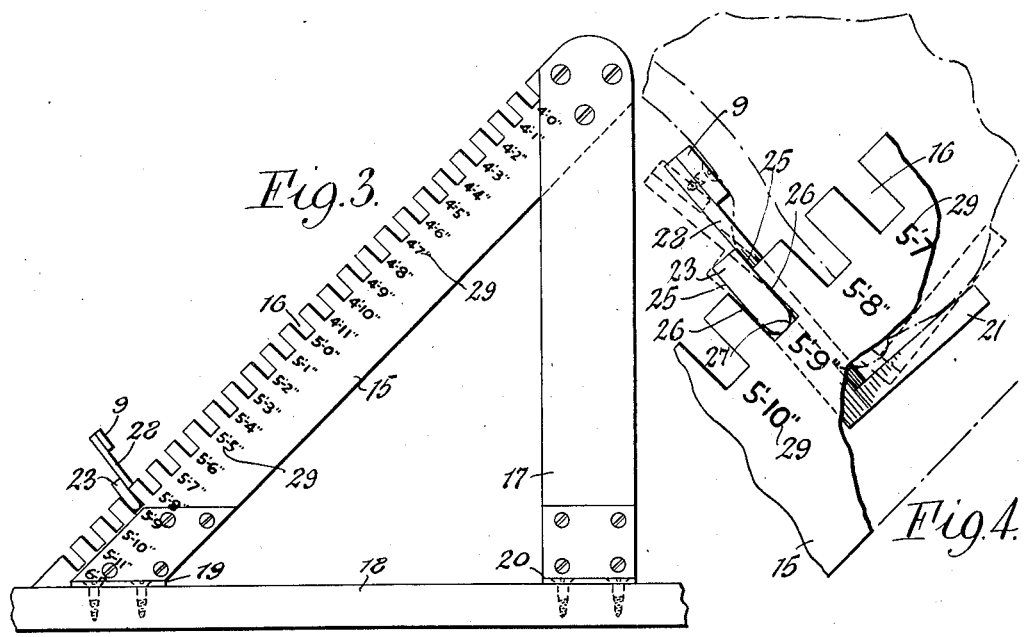
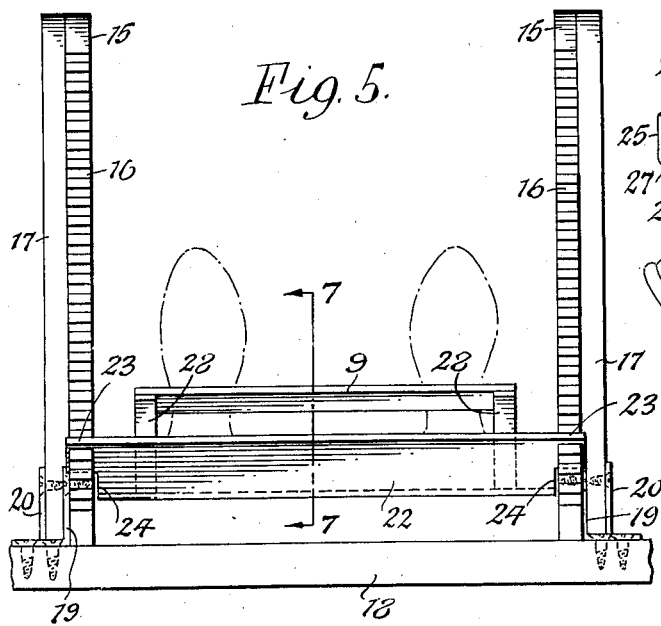
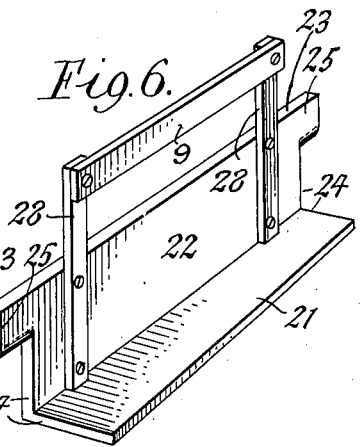
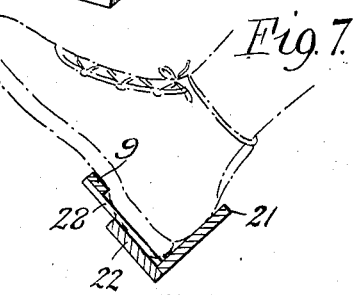
INVENTOR
Albert E. Gay
BY
ATTORNEYS.

Patented Nov. 18, 1941

2,262,761

UNITED STATES PATENT OFFICE 2,262,761

GYMNASTIC TESTING APPARATUS

Albert E. Gay, Lockport, N. Y.

Application September 4, 1940, Serial No. 355,333

9 Claims. (Cl. 272—61)

This invention relates to a gymnastic testing apparatus which is more particularly intended for testing the arm strength of girls although the same may also be employed for testing the arm strength of boys and other persons.

Heretofore such tests have usually been made by the subject taking hold with both hands on a pair of suspended rings and then pulling up the body by bending or flexing the arms, the strength of the latter being determined by the number of "pull ups" which the subject can make during a test. Testing children and other persons in this manner has been unsatisfactory owing to the fact that the difference in the heights of the subjects has not been taken into consideration and instead everyone takes the test by standing with heels only on the floor, taking a hand hold of the overhead rings and then pulling up the body by bending or flexing the arms as many times as possible. Inasmuch as the rings are always the same distance from the floor it necessarily follows that persons of different heights when holding onto the rings and pulling up the body do so under different angular conditions, therefore rendering it impossible to obtain definite and objective results that may be accepted as a valid test.

It is the object of this invention to provide a gymnastic testing apparatus of simple, efficient and convenient construction which permits of uniformly testing the "pull up" strength of persons of different heights.

In the accompanying drawings:

Fig. 1 is a side elevation of a satisfactory form of this invention showing diagrammatically the manner of testing the "pull up" capacity of two persons of different heights.

Fig. 2 is a perspective view of this apparatus.

Fig. 3 is a side elevation, on an enlarged scale compared with Figs. 1 and 2, of the apparatus embodying this invention.

Fig. 4 is a fragmentary side elevation of one of the adjusting bars and the heel rest of the apparatus on a still larger scale.

Fig. 5 is a front elevation of the apparatus on the same scale as Fig. 3.

Fig. 6 is a detached perspective view of the heel rest.

Fig. 7 is a vertical section, taken on line 7—7, Fig. 5.

In the following description similar characters of reference indicate like parts in the several views of the drawings.

This testing apparatus is designed for use in connection with an overhead support which is adapted to be grasped by the hands of the person undergoing the test which support may be variously constructed but preferably consists of an apparatus which is commonly used in gymnasiums for pulling up and other exercises and which, as shown in Figs. 1 and 2, comprises two spaced upright posts 10, 10 resting on the floor of a building or other surface, a horizontal bar 11 connected at its opposite ends with the upper ends of said posts, inclined guy wires or brace members 12 connecting the upper ends of said post with the floor or other surface, two spaced chains or flexible suspension members 13 depending from said horizontal bar, and two hand rings 14 connected with the lower ends of said chains.

Various gymnastic exercises may be taken by a person grasping the rings with the hands and pulling upwardly, or swinging lengthwise, or turning vertically. In the present case, however, this support is utilized in connection with the adjustable rack or stool which forms the subject of this invention and is adapted to be engaged by the heels of the persons making the test for the purpose of determining the number of times persons of different height can pull themselves up on the overhead support under the same conditions which have been established as a standard and thus permit of ascertaining the muscular efficiency of different persons regardless of any variation in height.

This adjustable heel supporting rack or stool in the preferred form shown in the drawings, is mounted on the floor in front of the horizontal bar and the hand rings suspended therefrom.

In general this rack or frame comprises a stand having two side sections or frames which are spaced transversely from each other, and a heel rest adapted to be engaged by the heels of the person making the test and mounted on the stand so as to be capable of vertical and horizontal adjustment relative to the overhead support in order to adapt the apparatus to persons of different height.

Each of these side sections of the stand includes an inclined front bar 15 which rises from its lower front end to its elevated rear end and is provided in its upper edge with a longitudinal row of adjusting notches 16 each of which has parallel sides 26 arranged at right angles to the upper edge of the respective inclined bar. Each of these side sections also includes an upright rear post or leg 17 which is connected at its upper end in any suitable manner with the elevated rear end of the respective inclined front bar 15. If desired the lower ends of the front and rear bars of each stand section may be secured directly to the floor of the room or other surface but it is preferable to mount both of these sections in a properly spaced relation on a portable base or platform 18 which may be readily moved into and out of the desired position relative to the hand rings 14. In its preferred form this base consists of a rectangular plate of metal, wood or other material and the front ends of the inclined bars 15 are connected with this base by means which include front angle irons 19 and the lower ends of the upright posts are connected therewith by means which include rear angle irons 20, as shown in Figs. 1, 2, 3 and 5. Means are provided for supporting the heels of a person while grasping the hand rings 14 during the operation of going through a pulling up test which means are adjustable both vertically and horizontally relative to the pull up rings 14 for adapting this testing apparatus to persons differing in height.

In its preferred construction these heel supporting means comprise a transverse angle bar which forms a substantially horizontal lower flange or plate 21 which is adapted to be engaged by the back or rear side of the heels of the feet of the person making the test and a substantially vertical flange or plate 22 adapted to be engaged by the underside or bottom of the heels of said person's feet. The flanges 21, 22 are comparatively broad or wide and the upper flange 22 is provided at its opposite ends with narrower adjusting lugs 23 thereby forming outwardly facing stop shoulders 24 on these flanges, as shown in Fig. 6. The lugs of the heel rest are adapted to be engaged with one or another of a pair of corresponding notches in the inclined bars of the side frames and the flanges 21, 22 of the angle bar are arranged between the inclined bars of the side frames. The horizontal rear and vertical front flanges 21, 22 of the heel rest are maintained in this relative position while in use by engagement of the opposite substantially vertical flat sides 25 of the adjusting lugs engaging with the flat parallel sides 26 of the respective adjusting notches which receive these lugs, and transverse movement of this angle iron forming the rear and front flanges 21, 22 is prevented by engagement of the stop shoulders 24 on the ends of these flanges with the inner sides of the inclined bars 15.

A limited turning or rocking movement of the angle iron 21, 22, as shown in Fig. 4, is permitted while the adjusting lugs 23 are in engagement with the respective notches 16 by making the lugs somewhat narrower than said notches and in addition providing the lower edges of these lugs with rounded faces 27 for engagement with the bottom of the respective notches. By these means this angle iron can rock vertically the requisite extent when the back and bottom of the heels of the feet of a person being tested engage with the horizontal and vertical flanges of this angle bar and thus permit this heel rest to be shifted to suit the change in position of a person while making a test.

In the absence of any provision to prevent it, the feet of the person undergoing a test might slip from the heel rest and safety means are therefore combined with the heel rest which are so constructed that the same are engaged by the full heel tread of the feet whereby slipping of the feet from the heel rest is prevented while using the apparatus. This safety device, however, does not enable the person making the test to gain added power for pulling up purposes as would be the case if more than the heels of the person were permitted to engage the heel rest.

Although these safety means may be variously constructed the same preferably comprise a horizontal guard bar 9 arranged transversely above the heel rest and connected with the flange 22 of the latter by means of two upright arms 28.

For the purpose of readily selecting the position which the heel rest should occupy on the stand for determining the arm strength of different persons one or both of the inclined bars of the stand are provided on the outer side with numerals or marks 29 adjacent to the several notches thereon each of which indicates the location of the proper notches adapted to receive the lugs of the heel rest for use in testing a person of a particular height. In the preferred construction the notches are so spaced that the shifting of the heel rest from one pair of notches of the inclined bars to the next pair of notches corresponds to a difference of one inch in height of persons. For this purpose each pair of notches is out of line vertically one-half an inch and also out of line horizontally one-half an inch from an adjacent pair of notches and the scale, graduations or measuring marks 29 associated therewith are indicated in steps of one inch apart. Obviously, however, the spacing apart of these notches and the measuring indications associated therewith may be finer or coarser if desired. In the example given in the drawings the tallest person capable of using this apparatus for testing pull up may be six feet in height while the shortest person may be four feet in height.

In the procedure of testing the arm strength of a person the height of the latter is first measured and then the heel rest is placed in those notches of the stand which correspond to this measurement minus fractions. The person then grasps both of the overhead rings with the hands and places the heels of both feet on the heel rest and supports the body in an inclined position while the legs and arms are straight or unfolded, as indicated in Fig. 1. The person now pulls up the body by flexing or bending the arms during which time the body is shifted from a lower axial line to an upper axial line and turns about a fulcrum located at the point of engagement of the heels with the heel rest which latter turns on the stand the requisite extent in accordance with the lifting movement of the body. The arms are then extended or straightened for lowering the body to its fullest extent during which time the same again turns about the fulcrum at the heels of the feet and the heel rest turns on the stand in the reverse direction. This operation is repeated as many times as the strength of the person undergoing the test will permit and the total count when compared with a previously established standard permits of grading the strength of the respective person and helps in determining what further form of exercise is best suited for improving or maintaining the physical condition of this person.

It will be noted upon an examination of the diagrammatic representation in Fig. 1, that when testing the pull up capacity of a tall person, shown by full lines 30 in Fig. 1, the heels are supported a considerable distance forward of the hand supporting rings and the body, during the extension of the arms, is arranged on a longitudinal axial line 31 which is comparatively low relative to the horizon and when the arms are flexed or bent the body is raised so that its axial line has been turned upwardly through an arc of substantially twenty-two and one-half degrees, as indicated by the axial line 32. It will also be noted that when testing the pull up capacity of a short person, shown by dotted lines 33 in Fig. 1, the heel rest has been shifted vertically upward and horizontally nearer to the underside of the hand rings, whereby a shorter person having her or his heels engaging the elevated heel rest with the arms stretched or extended will support the body so that the axial line 34 of the same will be arranged at a higher angle relative to the horizon than the corresponding lower position of a tall person and when the arms of the shorter person are flexed or bent the body is raised to a higher angle relative to the horizon, as indicated by the axial line 35, but also through an arc of substantially twenty-two and one-half degrees.

By the use of the heel rest which is adjustable both horizontally and vertically relative to the hand rings from which the body of a person taking the test is suspended the center of gravity of persons of different height is always brought vertically in line with the point of suspension and thus equalizes the conditions under which these tests are made of persons differing in height.

Owing to the fact that both short and tall persons pull up through an arc of like extent, it follows that the center of gravity of the persons of different height is constantly maintained with reference to a point from which the weight of the body of each person is suspended by taking the pull up test and all persons are tested as to arm strength in accordance with the same standard and can therefore be uniformly graded accordingly regardless of the height of the persons undergoing the tests.

I claim as my invention:

1. A gymnastic testing apparatus for use in connection with an overhead support adapted to be grasped by the hands of a person for performing "pull up" exercises, comprising a stand adapted to be placed on the floor in front of said overhead support, and a heel rest which is adapted to be engaged by the heels of the person while the hands of the same are grasping said support and which is adjustable on said stand both horizontally and vertically toward and from said support on an inclined plane which is highest at its rear end and nearest to said support and lowest at its front end farthest from said support.

2. A gymnastic testing apparatus for use in connection with an overhead support adapted to be grasped by the hands of a person for performing "pull up" exercises, comprising a stand adapted to be placed on the floor in front of said overhead support, and a heel rest which is adapted to be engaged by the heels of the person while the hands of the same are grasping said support and which is adjustable on said stand both horizontally and vertically toward and from said support, said stand including two side sections each of which is provided at its upper edge with an inclined row of notches, and said heel rest adapted to be engaged at its opposite ends with one or another pair of corresponding notches of said side sections.

3. A gymnastic testing apparatus for use in connection with an overhead support adapted to be grasped by the hands of a person for performing "pull up" exercises, comprising a stand adapted to be placed on the floor in front of said overhead support, and a heel rest which is adapted to be engaged by the heels of the person while the hands of the same are grasping said support and which is adjustable on said stand both horizontally and vertically toward and from said support, said stand including two side sections each of which is provided at its upper edge with an inclined row of notches, and said heel rest adapted to be engaged at its opposite ends with one or another pair of corresponding notches of said side sections and said heel rest being fitted loosely in said notches to permit the same to rock therein when subject to pressure from the feet of the person undergoing a test.

4. A gymnastic testing apparatus for use in connection with an overhead support adapted to be grasped by the hands of a person for performing "pull up" exercises, comprising a stand adapted to be placed on the floor in front of said overhead support, and a heel rest which is adapted to be engaged by the heels of the person while the hands of the same are grasping said support and which is adjustable on said stand both horizontally and vertically toward and from said support, said stand including two side sections each of which has an inclined adjusting bar provided with an inclined row of notches, and an upright leg connected at its upper end with the elevated end of said inclined bar, and said heel rest adapted to be engaged at its opposite ends with one or another pair of corresponding notches of said inclined bars.

5. A gymnastic testing apparatus for use in connection with an overhead support adapted to be grasped by the hands of a person for performing "pull up" exercises, comprising a stand adapted to be placed on the floor in front of said overhead support, and a heel rest which is adapted to be engaged by the heels of the person while the hands of the same are grasping said support and which is adjustable on said stand both horizontally and vertically toward and from said support, said stand including two side sections each of which has an inclined adjusting bar provided with an inclined row of notches, an upright leg connected at its upper end with the elevated end of said inclined bar, and a base connecting the lower ends of said inclined bar and upright leg and said heel rest including a transverse bar adapted to be engaged at its opposite ends with one or another pair of corresponding notches of said inclined bars.

6. A gymnastic testing apparatus for use in connection with an overhead support adapted to be grasped by the hands of a person for performing "pull up" exercises, comprising a stand adapted to be placed on the floor in front of said overhead support, and a heel rest which is adapted to be engaged by the heels of the person while the hands of the same are grasping said support and which is adjustable on said stand both horizontally and vertically toward and from said support, said stand being provided with graduations indicating the position of said notches relative to height of different persons to be tested.

7. A gymnastic testing apparatus for use in connection with an overhead support adapted to be grasped by the hands of a person for performing "pull up" exercises, comprising a stand adapted to be placed on the floor in front of said overhead support, and a heel rest which is adapted to be engaged by the heels of the person while the hands of the same are grasping said support and which is adjustable on said stand both horizontally and vertically toward and from said support, said heel rest including a substantially vertical flange adapted to be engaged by the underside of the heels of the person undergoing a test, and a substantially horizontal flange adapted to be engaged by the rear side of said heels.

8. A gymnastic testing apparatus for use in connection with an overhead support adapted to be grasped by the hands of a person for performing "pull up" exercises, comprising a stand adapted to be placed on the floor in front of said overhead support, and a heel rest which is adapted to be engaged by the heels of the person while the hands of the same are grasping said support and which is adjustable on said stand both horizontally and vertically toward and from said support, said heel rest including a lower substantially horizontal flange adapted to be engaged by the back of the heels of the person undergoing the test, a vertical flange arranged in front of said horizontal flange and adapted to be engaged by the bottom of said heels and a guard arranged above said vertical flange and adapted to be engaged by the full heel tread of the feet of said person.

9. A gymnastic testing apparatus for use in connection with an overhead support adapted to be grasped by the hands of a person for performing "pull up" testing exercises, comprising a stand adapted to be placed on the floor in front of said overhead support, and a heel rest which is adapted to be engaged by the heels of the person while the hands of the same are grasping said support and which is adjustable on said stand both horizontally and vertically toward and from said support, said stand including side sections each of which is provided with an inclined row of notches, and said heel rest having a broad central part adapted to be engaged by the heels of the person making the test and reduced ends which are adapted to engage with one or another pair of corresponding notches in said side sections, and said heel rest being provided between its broad central part and reduced ends with outwardly facing shoulders which engage with the inner side of said side sections.

ALBERT E. GAY.